April 17, 1956 T. E. PENLINGTON 2,742,597
SUBMERSIBLE ELECTRIC MOTORS
Filed July 29, 1953 2 Sheets-Sheet 2
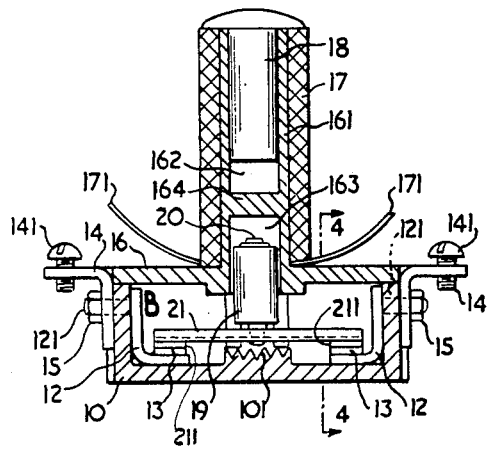
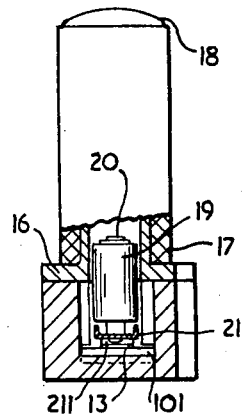
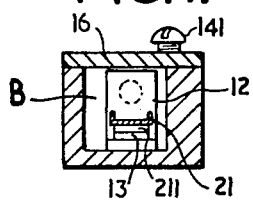
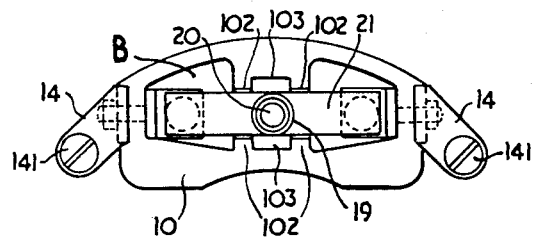

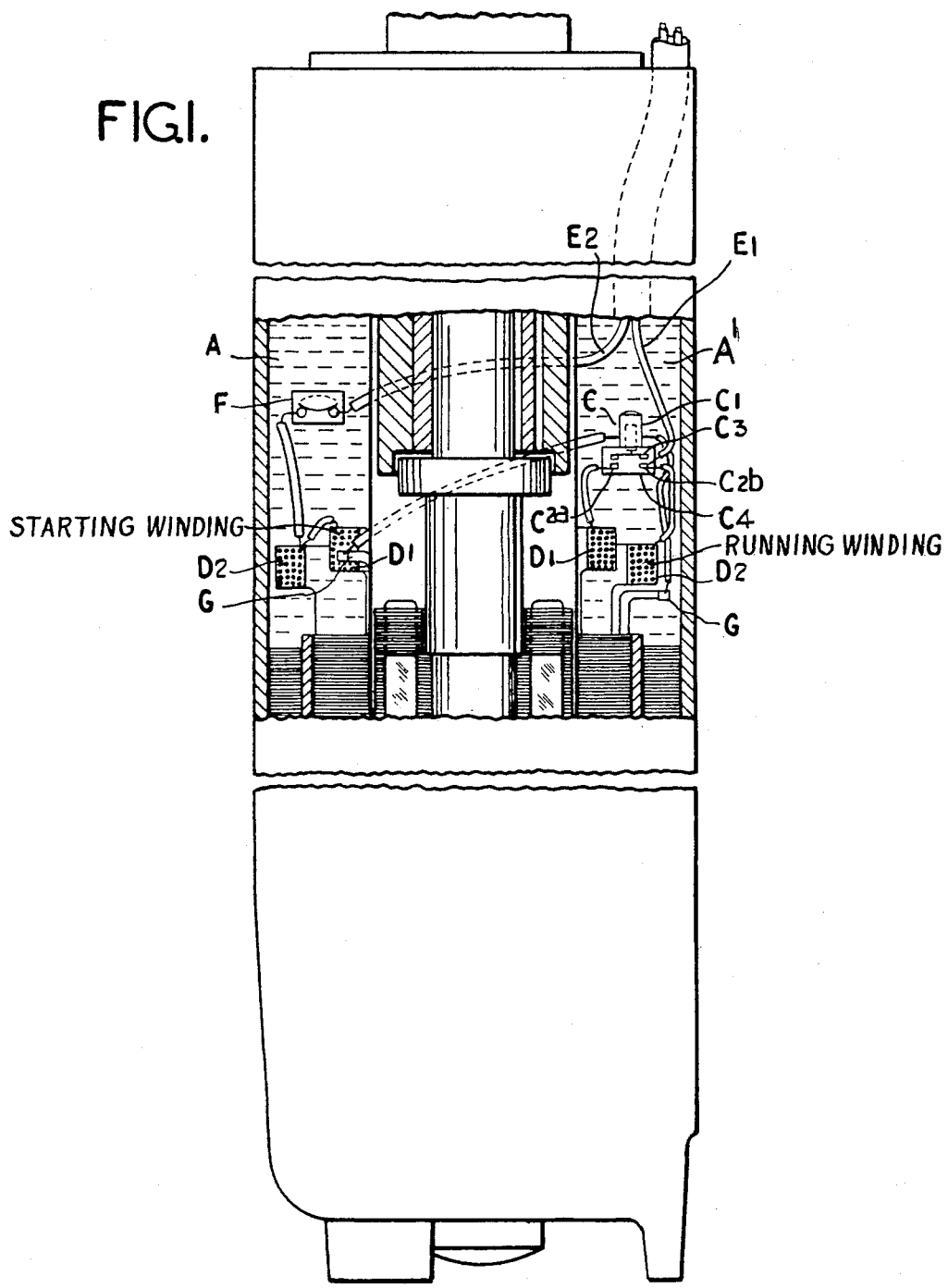

United States Patent Office 2,742,597
Patented Apr. 17, 1956

2,742,597

SUBMERSIBLE ELECTRIC MOTORS

Thomas Edward Penlington, Birmingham, England, assignor to James Beresford & Son Limited, Birmingham, England, a limited liability company of Great Britain Application July 29, 1953, Serial No. 371,024

Claims priority, application Great Britain May 26, 1953

1 Claim. (Cl. 318—221)

This invention has reference to improvements relating to submersible electric motors and is concerned specifically with submersible electric motors of the single phase split phase type.

The invention has for its object to provide a submersible electric motor of the single phase split phase type in which the control of the circuit through the starting winding is controlled by an electro-magnetic relay submersible with the motor.

Accordingly the invention consists of a submersible electric motor of the single phase split phase type in which the stator coils are contained within a coolant filled sealed chamber and in which the control of the circuit through the starting winding is effected by an electro-magnetic relay which is located within the said coolant filled sealed chamber with the contacts and the contact making elements of the relay protected from the coolant by enclosure within a fluid tight chamber and with the coil of the relay exposed to and subject to the cooling effect of the coolant medium contained with the coolant filled sealed chamber.

An embodiment of the invention will now be described with particular reference to the accompanying drawings in which:

Figure 1 is a view partly in side elevation and partly in section illustrative of a single phase split phase submersible electric motor in accordance with the invention, sufficient only of the construction of the motor being disclosed as is necessary to an understanding of the invention since the said electric motor as to its general construction follows a known practice.

Figure 2 is a detail view in vertical section and on an enlarged scale of the relay indicated in Figure 1.

Figure 3 is a view partly in end elevation and partly in section of the relay illustrated in Figure 2.

Figure 4 is a transverse section taken on the plane indicated by the line 4—4, Figure 2, looking in the direction of the arrows to said line, and Figure 5 is a plan of the electric relay illustrated in Figures 2 to 4 with the cover and parts carried thereby removed.

As illustrated in Figure 1, the submersible electric motor incorporates a stator chamber denoted by the reference letter A which is filled with transformer oil indicated by the reference letter A1 and which has located therein and submersed within the transformer oil an electro-magnetic relay denoted by the reference letter C, said transformer oil A1 serving both as an insulating and as a coolant medium.

The coil of the relay C denoted in Figure 1 by the reference $C_1$ is exposed to the transformer oil, whilst the contacts denoted in the said figure by the references $C_{2a}$ and $C_{2b}$ and the contact making and breaking member denoted by the reference $C_3$ in the said Figure 1 are enclosed within a fluid tight chamber denoted by the reference $C_4$ in Figure 1 so that no transformer oil can enter the chamber $C_4$.

The coil $C_1$ is connected to a special winding denoted by the reference letter G the purpose and arrangement of which is disclosed in the specification of the co-pending patent application Serial Number 371,027 filed July 29, 1953 whilst the contact $C_{2a}$ is connected to the starting winding $D_1$, and the contact $C_{2b}$ is connected to one of the current leads $E_1$. The starting winding $D_1$ and the main winding $D_2$ are interconnected with each other and with the other current lead $E_2$, a thermostatic overload switch F being connected in series in the lead $E_2$.

The electric current is conducted from the mains by the current leads $E_1$, $E_2$, by way of a starter H of known kind.

The relay C forms the subject of the invention disclosed in the specification of our co-pending patent application Serial Number 371,026 filed July 29, 1953 and is illustrated in some detail in Figures 2 to 5 of the accompanying drawings.

As illustrated in the said Figures 2 to 5 the relay includes a base 10 conveniently formed from the transparent synthetic plastic material known in commerce under the Registered Trademark "Perspex."

The sides of the base 10 are given an arcuate configuration externally so that the relay may fit snugly within the stator chamber of the submersible electric motor of known construction depicted by the reference letter A, see Figure 1.

The base 10 is hollow and the interior thereof constitutes a chamber B which is divided into two parts by a centrally disposed transverse web 101, said transverse web 101 being given a serrated configuration as and for a purpose to be described hereinafter.

In each end of the chamber B is an L-shaped conductor strip 12 which fits snugly within the relevent end of the chamber with the horizontal arm thereof carrying a contact 13. The conductor strips 12 aforesaid are electrically connected to externally disposed strip metal terminals 14 by means of nuts 15 which are engaged with the screw threaded portions of outwardly projecting pins 121 associated with the conductor strips 12.

The outwardly projecting arms of the terminals 14 are provided with tapped holes for the reception of terminal screws 141.

The base 10 is provided also with oppositely disposed inwardly projecting sections 102 which serve as guides for the contact making and breaking member to be described hereinafter.

The guide sections 102 are provided with shallow recesses 103 as and for a purpose to be described hereinafter.

The base 10 is adapted to be closed by a cover 16 of the same external configuration in plan as base 10 which is sealed to the base 10 by means of an adhesive or by means of heat treatment so that when the cover 16 is sealed in position the chamber in the base 10 is air and liquid tight.

The cover 16 is provided with a hollow upstanding cylindrical portion 161 which is divided into two sections 162, 163 by a transverse web 164.

This upstanding portion 161 constitutes a mounting for the coil 17, the ends 171 of which are denoted by the reference numeral 171 in Figure 2.

Located within the upper section 162 is the shank of a mushrom headed core 18 of a para-magnetic material, the diameter of the mushroom head of which is substantially the same as the external diameter of the coil 17.

Mounted within the lower section 163 is a cylindrical armature 19 which is axially displaceable on an upstanding rod 20 which is fixed at its lower end to the centre of the strip metal breaking member 21.

The rod 20 is not rigidly attached to the contact making and breaking member 21 so that a limited degree of play is allowed for self-alignment purposes.

The contact making and breaking member 21 is provided on the underside of the end portions thereof with contacts 211 which co-operate with the contacts 13 aforesaid.

The width of the contact making and breaking member 21 is slightly less than the distance between the presented ends of the inwardly projecting guide sections 102 so that the said contact making and breaking member 21 is permitted a guided vertical movement but is prevented from twisting. The cylindrical armature 19 is an easy sliding fit within the lower section 163.

The contact making and breaking member 21 tends to remain in the contact making position under the action of gravity but when the coil is energised the armature is drawn into the said section 163 thus entailing a lifting of the contact making and breaking member 21 for breaking the circuit controlled by the relay. The armature 19 falls to complete the circuit whenever the coil 17 is deenergised.

Although the relay is intended in the application illustrated for gravity operation, it will be readily understood that spring means may be provided which normally tends to maintain the contact making and breaking member 21 in the circuit making position but the opposition of which is overcome when the coil 17 is energised.

The chamber B may be exhausted of air or else may be filled with an inert gas, a convenient means of achieving this purpose being by drilling a hole through the web 164 and incorporating in the head of the core 18 a screw down valve, said seating communicating with a straight through axial bore in the said core 18. This screw down valve (not illustrated) is slackened for exhaustion or filling purposes and then screwed on to its seating for sealing after the requisite operation controlled thereby has been performed.

It is to be appreciated that by enclosing the contacts 13 and the contact making and breaking member 21 within a fluid tight sealed chamber B that "tracking" due to carbon derived from the transformer oil is entirely eliminated, thus making for the reliability which is essential in connection with a submersible motor which together with its associated pump is required to operate continuously submersed in a bore hole or well.

Furthermore, it should be appreciated that reliability is enhanced by exposing the coil 17 to the cooling action of the transformer oil.

I claim:

A single phase split phase submersible electric motor having a rotor and stator coils and including in its structure a liquid tight chamber containing the stator coils, sealed from the space occupied by the rotor and filled with transformer oil which serves as a coolant for the stator coils, an electromagnetic relay located within the said chamber and embodying in unitary assembly a coil which is exposed to the transformer oil, a fluid tight enclosure containing electrical contacts and the contact making and breaking member of the relay whereby the exposure of the coil of the relay to the transformer oil serves to cool the coil whilst the location of the electrical contacts of the contact making and breaking member of the relay within the fluid tight enclosure protects the said contacts and the contact making and breaking member from deleterious effects which might otherwise obtain were the contacts and contact making and breaking member immersed in the transformer oil, the electrical contacts aforesaid being connected in the starting winding circuit of the motor whereby, when the coil is energised to the appropriate extent it is desired to obtain when the motor has attained a predetermined speed subsequent to starting, the contact making and breaking member is caused to open the circuit through the contacts and thus to open circuit the starting winding.

References Cited in the file of this patent

UNITED STATES PATENTS

| | | |
|---|---|---|
| 1,567,598 | Jennings | Dec. 29, 1925 |
| 1,814,013 | Terry | July 14, 1931 |
| 1,935,228 | Kopeliowitsch | Nov. 14, 1933 |
| 2,539,048 | Arutunoff | Jan. 23, 1951 |